Aug. 19, 1958
I. S. SILVERSTEIN
2,847,987
FISHING LINE PROJECTOR
Filed Oct. 24, 1955
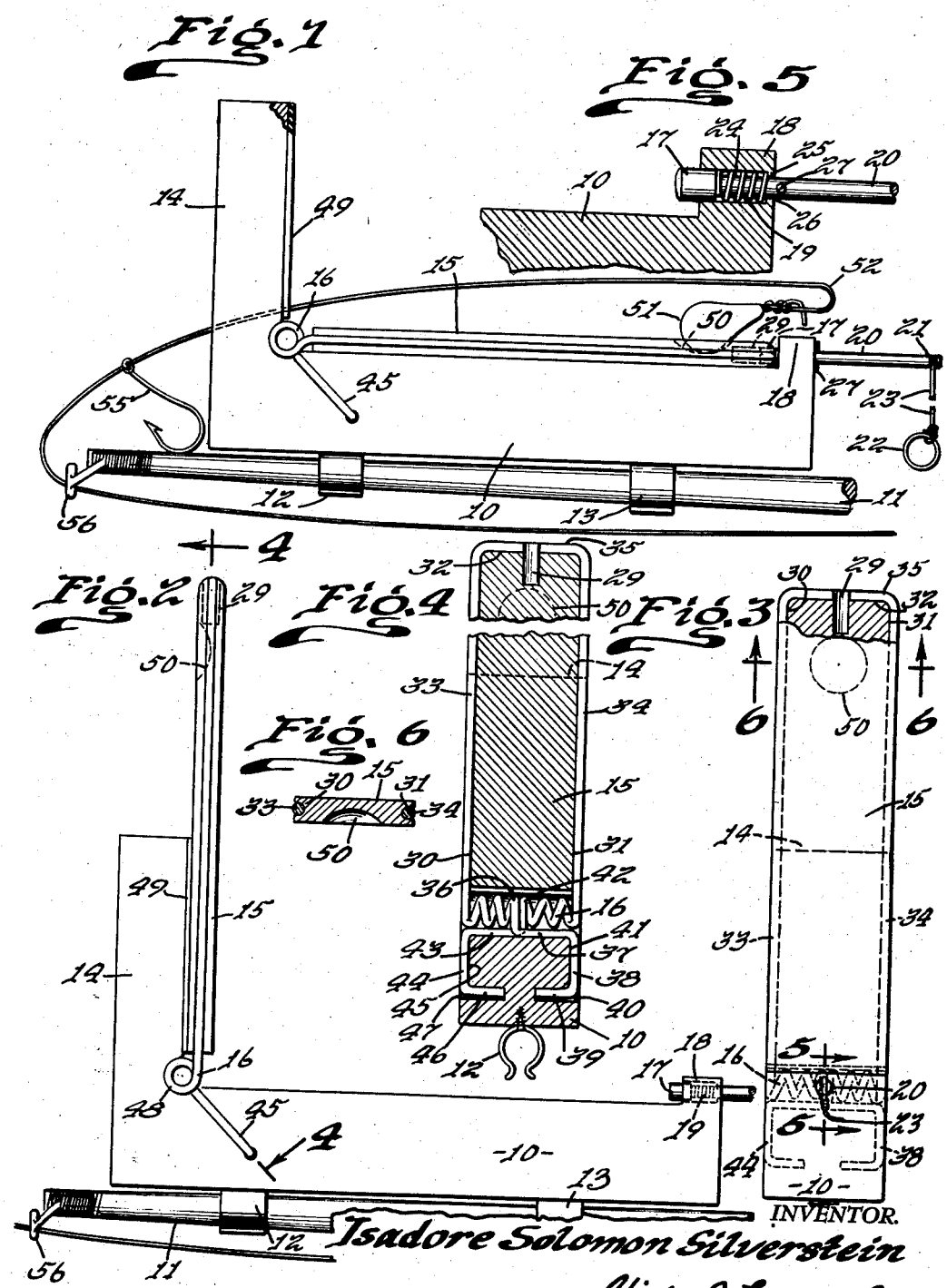
INVENTOR.
Isadore Solomon Silverstein
BY Victor J. Evans & Co.
ATTORNEYS

United States Patent Office 2,847,987
Patented Aug. 19, 1958

2,847,987
FISHING LINE PROJECTOR

Isadore Solomon Silverstein, Philadelphia, Pa.

Application October 24, 1955, Serial No. 542,331

2 Claims. (Cl. 124—7)

This invention relates to fishing tackle, and particularly mechanical devices for projecting the fishing line with hooks, bait and a weight thereon, and in particular a spring arm on an L-shaped mounting with means for attaching the mounting to an end of a fishing rod and with means, adapted to be actuated from the handle of the rod, for retaining the spring arm in the cocked position.

The purpose of this invention is to provide a device for projecting a fishing line from the end of a fishing rod to facilitate casting with spinning reels.

Various types of mechanically actuated arms and levers have been provided for throwing fishing lines and other objects and various types of rods have been used in combination with spinning reels, however, with comparatively light weight lures particularly of the type that float on the water it is difficult to make a long cast and when casting from underbrush or under branches of trees and the like casting is substantially impossible. With this thought in mind this invention contemplates a line throwing device adapted to be carried on the end of a fishing rod whereby with the device released with the fishing rod in an extended position the line is cast directly outward therefrom and with a relatively strong spring a long cast may be made.

The object of this invention is, therefore, to provide a mechanical or spring actuated throwing device adapted to be positioned on the end of a fishing rod to facilitate casting a fishing line from the rod.

Another object of the invention is to provide a fishing line projector adapted to be carried on the end of a fishing rod in which projecting elements thereof are adapted to be released from the handle of the fishing rod.

A further object of the invention is to provide a fishing line projector adapted to be mounted on the end of a fishing rod in which the device is adapted to be used on fishing lines now in use without changing structures of the rods and also in which the device is of a simple and economical construction.

With these and other objects and advantages in view the invention embodies an L-shaped bracket having a throwing arm mounted thereon and adapted to be actuated by a spring, and a latch adapted to be actuated from the handle of a fishing rod upon which the bracket is positioned, for retaining the throwing arm or lever in the cocked position.

Other features and advantages of the invention will appear from the following description taken in connection with the drawing, wherein:

Figure 1 is a side elevational view showing the fishing line projector of this invention mounted on the extended end of a fishing rod with the weight of a fishing line resting in a recess in an arm of the projector.

Figure 2 is a view similar to that shown in Fig. 1 showing the spring or throwing arm at the end of the projecting stroke.

Figure 3 is an elevational view looking toward the end of the projector in which the latch for retaining the projecting arm in the cocked position is located and with parts broken away, and other parts shown in section.

Figure 4 is a cross section through the throwing arm and mounting element of the projector taken on line 4—4 of Fig. 2.

Figure 5 is a longitudinal section taken on line 5—5 of Fig. 3 showing the latch for retaining the throwing arm in the cocked position.

Figure 6 is a cross section taken on line 6—6 of Fig. 3 showing the weight or sinker receiving recess in the extended end of the arm.

Referring now to the drawing wherein like reference characters denote corresponding parts the improved fishing line projector of this invention includes an L-shaped base 10 adapted to be secured on a fishing rod 11 with spring clips 12 and 13. The L-shaped base 10 includes a stop 14 extended upwardly from one end of the base, an arm 15 connected by a coil spring 16 to the base 10 and a plug or latch 17 mounted in a lug 18 on the end of the base opposite to that on which the stop 14 is positioned. The latch 17 is urged outwardly by a spring 19 that is provided with a stem 20 having an opening 21 in the extended end in which a finger receiving loop 22 is secured by a cord 23. The latch 17 and spring 19 are positioned in a counterbore or opening 24, one end of which is provided with a bead or flange 25 providing an opening 26 for the stem 20 and the latch 17 is retained in the opening 24 by a pin 27 that extends through the stem 20 and is positioned against the end surface of the lug 18 until the latch 17 is drawn into the opening 24 by the cord 23.

The latch 17 is adapted to snap into an opening 29 in the end of the arm 15 and when it is desired to release the spring arm 15 the latch 17 is drawn out of the opening 29 by gripping the ring or loop 22 which is adapted to be positioned on the handle of the fishing rod.

The arm 15 is provided with recesses 30 and 31 in the edges and 32 across the extended end and wires 33 and 34, which form side members of a loop extended around the arm 15 are positioned in the recesses, as shown in Figs. 4 and 6. The extended ends of the wires 33 and 34 are connected with a cross member 35 that is positioned in the recess 32 and the opposite ends of the side wires are coiled to provide the spring 16, one end 36 thereof extending outwardly providing a section 37, downwardly at an angle providing a section 38 and inwardly providing an end 39 which extends into an opening 40. The section 38 is positioned in a recess 41 at the lower end of the recess 31 and the portion 37 is provided in a similar recess. The inner end of the coil of the wire 34 terminates in a section 42 from which a section 43 extends and from the end of the section 43 a portion 44 extends downwardly at an angle, in a recess 45. The extended end of the portion 44 is provided with an end 46 which extends into an opening 47 in the side of the base 10 opposite to that in which the opening 40 is provided.

The coil 16 is positioned in a transversely disposed recess 48 in the L-shaped recess formed by the intersection of the inner surfaces of the base 10 and stop 14 and the face of the stop is provided with a panel 49 of rubber or other suitable material.

The face of the arm 15 is also provided with a recess 50 that is positioned to receive a weight or sinker, as indicated by the numeral 51 and with the device in the cocked position, as illustrated in Fig. 1 the sinker is positioned in the recess and a fishing line 52 on which a hook 55 is positioned extends from the weight through an eye 56 on the end of the rod to a reel at the opposite end or handle, the line extending through spaced eyes on the rod.

With the parts designed and assembled as illustrated and described the hook 55 may be provided with bait or a suitable lure may be used and with the weight in the recess 50 and with the rod extended the latch 17 is withdrawn by the cord 23 and finger ring 22 whereby the arm 15 is released, and upon being released, the spring 16 snaps the arm from the position shown in Fig. 1 to that shown in Fig. 2 whereby the weight is thrown forwardly from the end of the fishing rod carrying the bait or lure and drawing the line from the reel.

The fishing line is adapted to be retrieved in the conventional manner.

It will be understood that modifications, within the scope of the appended claims, may be made in the design and arrangement of the parts without departing from the spirit of the invention.

What is claimed is:

1. In a fishing line throwing device, the combination which comprises an L-shaped mounting element having a base with a stop extended upwardly from one end, spring clips on the base for attaching the base to a fishing rod, an arm having a weight receiving recess therein, a spring pivotally mounting the arm on the mounting element and adapted to actuate the arm to project a weight positioned in the recess thereof, said arm having a recess in each side edge and in the end edge thereof and said spring being seated in said recesses and having a pair of coils therein the ends of which are inserted into the opposite sides of said base, a latch mounted on the base and positioned to engage the arm for retaining the arm in a cocked position, a cord having a finger receiving ring on the extended end attached to the latch and extended to the handle of the fishing rod, and a spring for retaining the latch in the position of holding the arm in the cocked position.

2. In a fishing line throwing device, the combination which comprises an L-shaped mounting element having a base with a stop extended upwardly from one end, spring clips on the base for attaching the base to a fishing rod, an arm having a weight receiving recess therein, a spring pivotally mounting the arm on the mounting element and adapted to actuate the arm to project a weight positioned in the recess thereof, said arm having a recess in each side edge and in the end edge thereof and said spring being seated in said recesses and having a pair of coils therein the ends of which are inserted into the opposite sides of said base, a latch mounted on the base and positioned to engage the arm for retaining the arm in a cocked position, a cord having a finger receiving ring on the extended end attached to the latch and extended to the handle of the fishing rod, and a spring for retaining the latch in the position of holding the arm in said cocked position, said stop extended upwardly from the base having a resilient cushion on the face thereof and said cushion being positioned to be engaged by the arm.

References Cited in the file of this patent

UNITED STATES PATENTS

| | | |
|---|---|---|
| 266,980 | Easton | Nov. 7, 1882 |
| 1,054,916 | Gray | Mar. 4, 1913 |
| 1,140,608 | Phillips | May 25, 1915 |
| 1,295,069 | Rouen | Feb. 18, 1919 |
| 2,340,588 | Groves | Feb. 1, 1944 |
| 2,665,677 | Witlock | Jan. 12, 1954 |

FOREIGN PATENTS

| | | |
|---|---|---|
| 19,736 | Great Britain | Sept. 19, 1908 |